US008533355B2

(12) United States Patent
Froehlich et al.

(10) Patent No.: US 8,533,355 B2
(45) Date of Patent: Sep. 10, 2013

(54) TECHNIQUES FOR IMPROVED CLOCK OFFSET MEASURING

(75) Inventors: Steven E. Froehlich, Danbury, CT (US); Michel H. T. Hack, Cortlandt Manor, NY (US); Xiaoqiao Meng, Mt. Kisco, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 12/610,430

(22) Filed: Nov. 2, 2009

(65) Prior Publication Data

US 2011/0106968 A1    May 5, 2011

(51) Int. Cl.
  *G06F 15/16*    (2006.01)
(52) U.S. Cl.
  USPC ........... 709/232; 709/202; 709/203; 709/206; 709/205; 709/207
(58) Field of Classification Search
  USPC .................. 709/232, 202, 203, 206, 205, 207
  See application file for complete search history.

(56) References Cited

U.S. PATENT DOCUMENTS

| | | | | |
|---|---|---|---|---|
| 5,553,222 | A * | 9/1996 | Milne et al. ................... | 715/201 |
| 6,928,473 | B1 | 8/2005 | Sundaram et al. ............. | 709/224 |
| 6,957,357 | B2 | 10/2005 | Liu et al. ....................... | 713/503 |
| 7,072,432 | B2 | 7/2006 | Belcea ........................... | 375/356 |
| 7,092,410 | B2 | 8/2006 | Bordonaro et al. ........... | 370/516 |
| 7,103,514 | B1 | 9/2006 | Carlson et al. ................ | 702/189 |
| 7,194,649 | B2 | 3/2007 | Liu et al. ....................... | 713/400 |
| 7,590,151 | B2 | 9/2009 | Middleton et al. ............ | 370/516 |
| 2002/0039371 | A1 | 4/2002 | Hedayat et al. ............... | 370/516 |
| 2002/0136335 | A1 | 9/2002 | Liou et al. ..................... | 375/354 |
| 2004/0062280 | A1 | 4/2004 | Jeske et al. .................... | 370/517 |
| 2006/0206558 | A1 | 9/2006 | Cohen et al. .................. | 709/201 |
| 2006/0269029 | A1 | 11/2006 | Repko et al. .................. | 375/356 |
| 2007/0061607 | A1 | 3/2007 | Carlson et al. ................ | 713/503 |
| 2007/0086489 | A1 | 4/2007 | Carlson et al. ................ | 370/516 |
| 2007/0121523 | A1 | 5/2007 | Morandin ...................... | 370/252 |

(Continued)

FOREIGN PATENT DOCUMENTS

| | | | |
|---|---|---|---|
| EP | 0697774 A1 * | 8/1994 | |
| WO | WO 2005/002100 A1 | 1/2005 | |
| WO | WO 2008/138850 A1 | 11/2008 | |

OTHER PUBLICATIONS

Prabir Barooah et al., "Recursive Time-Synchronization In Sensor Networks", MILCOM 2008, IEEE, Military Communications Conference 2008, IEEE.

Wikipedia, "Precision Time Protocol"; http://en.wikipedia.org/wiki/Precision_Time_Protocol; Categories: Synchronization/IEC standards/IEEE standards/Network time-related software; modified Sep. 13, 2009.

(Continued)

*Primary Examiner* — Lan-Dai Truong
*Assistant Examiner* — Lan-Dai T Truong
(74) *Attorney, Agent, or Firm* — Harrington & Smith

(57) ABSTRACT

In an exemplary aspect, method, apparatus, and program products are disclosed suitable for clock offset determination. One method includes performing a number of exchanges of at least single bytes with another network node, where values of the single bytes are different for the exchanges. The method also includes capturing and storing timestamps for each of the number of exchanges performed on the network node. A second method includes capturing and saving arrival timestamps for each of a number of timing messages in a set of timing messages received from another network node. This second method also includes sending the timestamps to at least the another node in response to completion of the set of timing messages.

29 Claims, 11 Drawing Sheets

(56) References Cited

U.S. PATENT DOCUMENTS

| | | | |
|---|---|---|---|
| 2007/0186279 A1 | 8/2007 | Zimmer et al. | 726/9 |
| 2008/0151771 A1 | 6/2008 | Dowse | 370/252 |
| 2009/0052431 A1 | 2/2009 | Kroener et al. | 370/350 |
| 2010/0138187 A1* | 6/2010 | Dzung et al. | 702/176 |
| 2010/0238917 A1* | 9/2010 | Silverman et al. | 370/350 |
| 2011/0106968 A1 | 5/2011 | Froehlich et al. | 709/232 |

OTHER PUBLICATIONS

NIST, National Institute of Standards and Technology, IEEE 1588 Website; ISPCS-2009 Brescia, Italy, Oct. 12-16, 2009, IEEE 1588-2008 available from IEEE Standards Association; http://ieee1588.nist.gov; Updated Dec. 10, 2008.

* cited by examiner

| Previous Action | Expected | Next Action |
|---|---|---|
| - sent init request | → receive ack | → send byte=n (n>0) |
| - sent byte=n (n>1) or<br>- sent byte=n (n>1) | → receive byte=n | → send byte=n-1 |
| | → receive byte=0 | → wait for timestamps |
| sent byte=1 | → receive byte=1 | → wait for timestamps |

FIG. 7

| Previous Action | Unexpected | Next Action |
|---|---|---|
| sent init request → | receive byte=n → | clean up (left from prev pp) |
| sent init request → | client long timeout → | clean up (dead link) |
| sent byte=n → | receive ack → | shouldn't happen; clean up |
| sent byte=n → | receive byte=0 → | wait for timestamps (server timed out) |
| sent byte=n → | receive byte≠n → | shouldn't happen; clean up |
| sent byte=n>1 → | client timeout → | send byte=0 |
| sent byte=1 → | client timeout → | wait for timestamps |
| sent byte=0 → | receive byte=* → | discard & wait for timestamps |
| sent byte=0 → | client long timeout → | clean up (dead link) |

FIG. 8

| Previous Action | Expected | Next Action |
|---|---|---|
| - sent timestamps → | receive init → | send ack |
| - sent ack → | receive byte=n → | send byte=n |
| - sent byte=n (n>1) → | receive byte=n-1 → | send byte=n-1 |
| sent byte=1 → | | send timestamps |

FIG. 9

| Previous Action | Unexpected | Next Action |
|---|---|---|
| • sent timestamps → | receive byte=* → | discard (server timed out) |
| • sent ack → | receive init → | send ack (client restarted) |
| • sent byte=n (n>1) → | receive byte=0 → | client timed out; send timestamps |
| • sent byte=n (n>1) → | receive init → | shouldn't happen; clean up |
| • sent byte=n (n>1) → | receive byte≠n-1 → | shouldn't happen; clean up |
| • sent byte=n (n>1) → | server timeout → | send byte=0; send timestamps |
| • sent byte=1; sent timestamps → | receive init → | normal |
| • sent byte=1; sent timestamps → | receive byte=0 → | client timed out; no need to send timestamps |
| • sent byte=1; sent timestamps → | receive byte=* → | shouldn't happen; clean up |

FIG. 10

TECHNIQUES FOR IMPROVED CLOCK OFFSET MEASURING

BACKGROUND

This invention relates generally to networks and, more specifically, relates to measuring clock offsets of network nodes.

It is widely held that software-only solutions to clock synchronization suffer from inevitable "system noise" (process dispatching, interrupt handling, etc.) that limit accuracy to 10 microseconds or more. When microsecond-level synchronization is needed, hardware solutions are employed, e.g., network adapters with IEEE 1588 (Precise Time Protocol) support at both ends of the communication link.

As depicted in FIG. 1, the typical software timestamp exchange has client node A send a timestamp T1 to server node B, which receives it at time T2. Server node B then sends a reply at time T3, and client node A receives it at time T4. T1 and T4 are measured using client node A's clock; T2 and T3 are measured on server node B's clock. From this information the offset between the clocks of client A and server B can be determined—but software as well as hardware delays contribute to high jitter. IEEE 1588 takes the timestamps at the hardware level, and provides an interface to collect those timestamps. However, the hardware implementation as in IEEE 1588 is more expensive and more difficult to modify than is a software implementation.

It would therefore be desirable to provide techniques that overcome these limitations.

SUMMARY

In an exemplary aspect of the invention, a method is disclosed that is performed on a network node. The method includes performing a number of exchanges of at least single bytes with another network node, where values of the single bytes are different for the exchanges. The method also includes capturing and storing timestamps for each of the number of exchanges performed on the network node.

In another exemplary aspect, a network node is disclosed that is configured to perform a number of exchanges of at least single bytes with another network node, where values of the single bytes are different for the exchanges. The network node is also configured to capture and store timestamps for each of the number of exchanges performed on the network node.

In another aspect, a method is disclosed that is performed on a network node. The method includes capturing and saving arrival timestamps for each of a number of timing messages in a set of timing messages received from another network node. The method also includes sending the timestamps to at least the other node in response to completion of the set of timing messages.

In an additional exemplary aspect, a network node is disclosed that is configured to capture and save arrival timestamps for each of a number of timing messages in a set of timing messages received from another network node, and configured to send the timestamps to at least the other node in response to completion of the set of timing messages.

BRIEF DESCRIPTION OF THE SEVERAL VIEWS OF THE DRAWINGS

The foregoing and other aspects of embodiments of this invention are made more evident in the following Detailed Description of Exemplary Embodiments, when read in conjunction with the attached Drawing Figures, wherein:

FIG. 7 is a diagram of client states and actions, under normal behavior;
FIG. 8 is a diagram of client states and actions, under exception behavior;
FIG. 9 is a diagram of server states and actions, under normal behavior;
FIG. 10 is a diagram of server states and actions, under exception behavior.

DETAILED DESCRIPTION

In an exemplary embodiment, a new technique for clock offset measuring is disclosed that uses a "ping pong" series of exchanges reduced to its absolute minimum, where each exchange involves a single byte that is different on each exchange (e.g., a decrementing remaining-message count), and may be used to determine whether the single byte is the last exchange in the series. The network nodes on each side of the exchanges record arrival and departure timestamps privately, and at the end of the exchange the collected timestamps are returned to the other side (for one or both of the network nodes), e.g., in a non-time-critical message. In an embodiment, a protocol implementation ensures that each side of the byte exchange knows whether another packet is still expected after a timeout, and that there can only be one such delayed packet. This greatly simplifies timeout recovery, and removes a need to re-initialize a link after a timeout due to uncertainty (the simplest, though not the only, recovery method).

Additional benefits of the single-byte exchanges (in an exemplary embodiment) include, but are not limited to, that these exchanges permit simple data-driven spin-loops to be used in the Remote Direct Memory Access (RDMA) case: as soon as the target byte changes, the reply byte can be sent, without having first to poll for a completion status. In the exemplary case of InfiniBand (a communications link primarily used in high-performance computing), this can reduce the already low latency by at least a microsecond.

Figure 1:
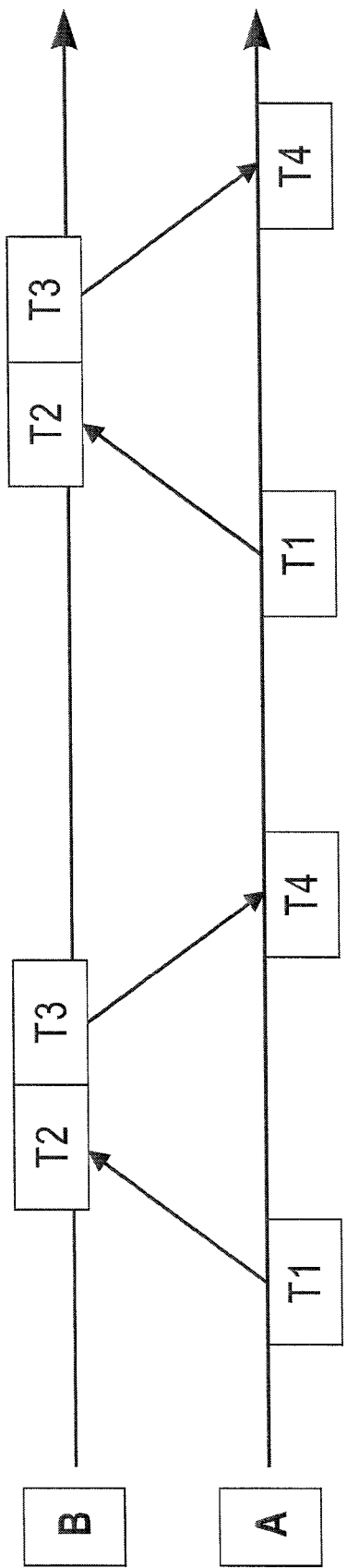
FIG. 1 depicts an existing timestamp exchange method.
Figure 2:
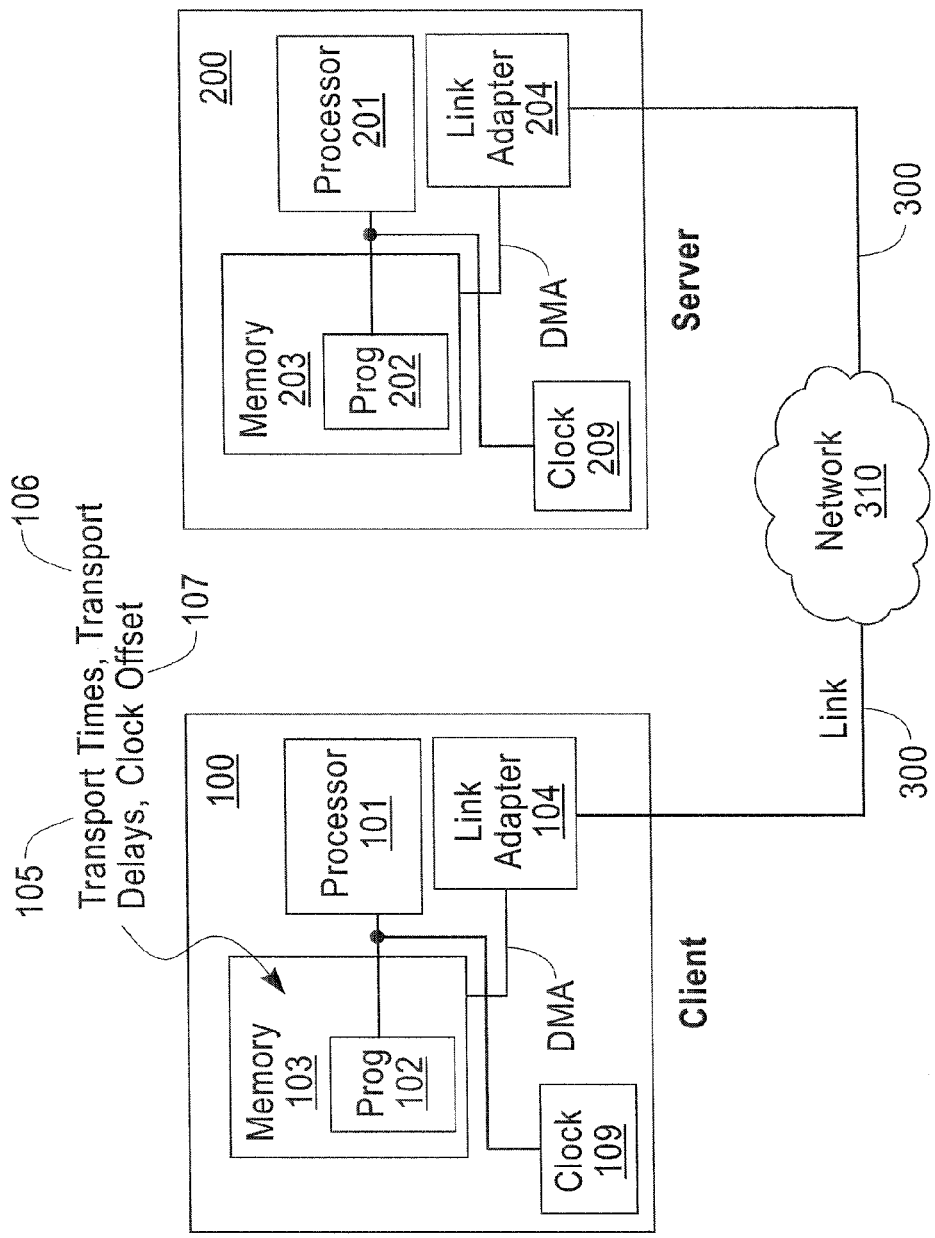
FIG. 2 depicts a hardware block diagram showing communication between two network nodes.

Turning now to FIG. 2, this figure depicts a hardware block diagram of two network nodes, client 100 and server 200. As shown, the client 100 includes one or more processors 101 arranged to access one or more memories 103, where the memories 103 include a computer program 102. The client 100 also includes a clock 109. Likewise, the server 200 includes one or more processors 201 arranged to access one or more memories 203, where the memories 203 include a computer program 202. The server 200 includes a clock 209. The client and server communicate over physical links 300, controlled by a link adapter 104/204 on each side, and through network 310. Information in memories 103/203, in an exemplary embodiment, can be communicated between each the memories 103/203 via Direct Memory Access (DMA), and the interaction between the two memories through the link 300 is what permits the Remote Direct Memory Access (RDMA) protocol, a protocol useful for certain embodiments of the present invention. It should be noted that other protocols may be used to exchange data over the link 300. The clock offset between clock 109 of the client 100 and clock 209 of the server 200 is what is to be determined in an exemplary embodiment herein. It is noted that the aspects of the present invention work for any two network nodes, and are not confined to a server 200 and client 100.

The one or more memories 103 also include data representing transport times 105, transport delays, and clock offset 107 in this non-limiting example. These are described in more detail below. The server 200 may also include data representing transport times 105, transport delays, and clock offset 107 in its one or more memories 203 (not shown in FIG. 2). Time stamps also reside in memories 103/203, as described in more detail below.

The programs 102/202, when executed by their respective one or more processors 101/201, configure the client 100 and server 200 to perform the actions described herein. In particular, any of the actions in FIGS. 3-10 may be performed by the configured client 100/server 200, as configured by the respective program 101/201.

An exemplary embodiment of the invention includes a program 202 running on the server 200, communicating with a program 102 running on the client 100. The server 200 and client 100 coordinate to start a client offset measuring process. In one embodiment, the coordination includes the server program 202 waiting for a "doorbell" (or "init") request from the client 100 to start a sequence of ping pong message exchanges to collect the timestamp measurements during the exchange. Embodiments may or may not require server 200 to acknowledge (ACK) the request. These timestamps, from both the server 200 as well as the client 100, are used to estimate the relative skew and offset between the client and server clocks. The client program 102 in this example initiates the ping pong message exchange. One single byte is sent in each message between the client and the server during the ping pong exchange. In the embodiments shown in the figures, the value of the byte is one more than the remaining packets to be exchanged, with zero having a separate meaning to signal that the sender experienced a timeout and is therefore expecting exactly one more reply. However, the invention is not limited to this. In an exemplary embodiment, the client program 102 is responsible to decrement the byte after each round trip. The server 200 (e.g., program 202) records a timestamp every time the server 200 receives the single byte. The server 200 sends the same byte back to the client in one embodiment. When the byte is equal to 1 (one) or 0 (zero), the server 200 immediately (for instance) sends back all the timestamps the server 200 has collected during the current ping pong exchange. After the client 100 sends a byte having a value of one, the client 100 expects the next message from the server 200 to contain all the timestamps, instead of a single byte.

Figure 3:
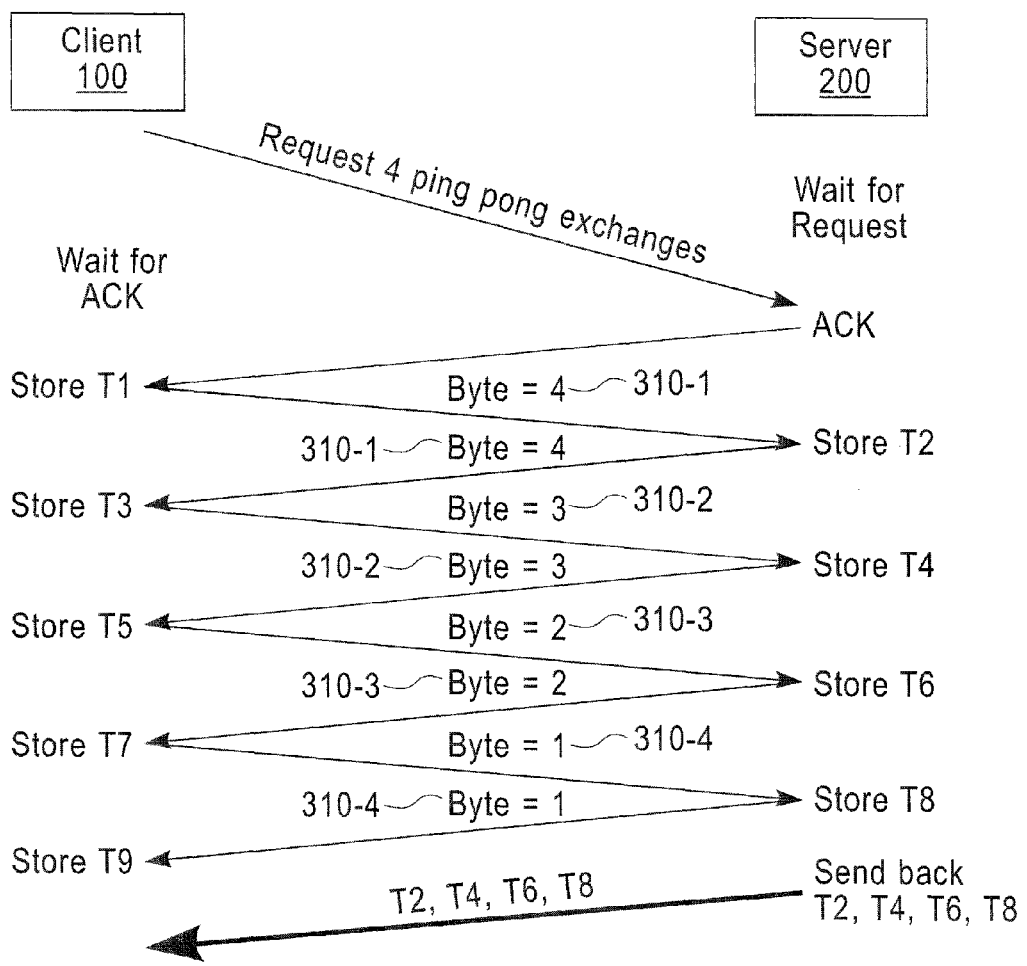
FIG. 3 illustrates an exemplary protocol for performing clock offset measuring, under normal behavior.

In an exemplary embodiment, an implementation is created as communication protocol that is built on top of a reliable communication channel that uses link 300. This exemplary protocol (and flow diagram) is shown in FIG. 3. All the messages will be delivered in the order they are sent, with a possible delay in the delivery. Because of the possible delay in message delivery, in an exemplary embodiment, both the client and server programs use a time out mechanism to prevent excessively long ping pong exchanges. Exemplary time out mechanisms are described below.

FIG. 3 illustrates an exemplary scenario as described above. In the example of FIG. 3, four ping pong exchanges are scheduled. The client 100 coordinates with the server 200 to start the clock offset measuring process by requesting 4 (four) ping pong exchanges, and in this example, the server 200 responds with an acknowledge (ACK).

The clock offset measuring process then begins by having a first exchange of timing messages between the client 100 and server 200. The exchange includes the client 100 sending a byte 310-1 having the value of 4 (four), and the server 200 receiving this byte 310-1. The client 100 captures and stores client timestamp T1, and the server captures and stores server timestamp T2. The exchange concludes with the server 200 sending back the byte 310-1 to the client 100. The client 100 captures and stores the client timestamp T3, and then proceeds with the second exchange. Capturing and storing the client timestamp T3 may be considered to be part of the first or second exchange.

The second exchange includes the first sending and receiving of the byte 310-2 having a value of 3 (three), the capturing and storing of the client timestamp T4, the sending and receiving of the byte 310-2, and the capturing and storing of the server timestamp T5. The third and fourth exchanges include the exchanges of bytes 310-3 and 310-4, having values of 2 (two) and 1 (one) respectively and the storing of timestamps T6, T7, T8, and T9.

In response to completion of the predetermined number of exchanges, the server 200 sends the server timestamps T2, T4, T6, and T8 to the client 100. In the example of FIG. 3, completion is determined by the server 200 by the reception and sending of a byte 310 having a value of 1 (one).

It should be noted that the single bytes being exchanged are timing messages containing a single byte data payload, and the packet containing the timing message may have additional information. It should also be noted that sending a single element of a single byte is beneficial at least because single bytes eliminate some potential additional processing. For example, when a message is sent from one computer to another, one of the computers may have to change the order of the bytes in the message, e.g., because of "endianness". As is known in the art, "endianness" is the byte (or larger memory element) ordering used to represent data. For instance, two bytes of A and B (therefore making one word) may be stored as AB or as BA. A network node receiving BA would have to determine that the bytes need to be switched to AB for use on that particular network node. If there is only a single byte, then it does not matter which endianness each of the computers uses. So, sending a single memory element such as word or a double word will require the endianness to be addressed. Nonetheless, if an implementation can handle this processing, then the other single elements of words and double words may be used. For networks using TCP/IP (transmission control protocol/Internet protocol), the advantage of avoiding endianness issues is primarily simplicity; the performance impact is typically negligible. Endianness will have to be considered when transmitting the timestamps at the end of the ping pong exchange, so one cannot avoid the issue completely. However for networks using RDMA, the single byte spin loop capability is much more significant from a technical point of view and can lead to a measurable performance improvement.

It should be noted that the protocol in FIG. 3 is merely exemplary and that many changes may be made to this protocol and still be within the scope of the exemplary embodiments of the invention. In a further exemplary embodiment, the client 100 decrements the number in the byte 310 between exchanges. In another embodiment, the client 100 has the next number ready to be transmitting in response to sending the previous byte 310. For example, after byte 310-1 is sent, the client 100 could prepare another byte with the value 3

(three), ready to be sent once the byte 310-4 is received from the server 200. As another example, the client 100 could prepare four bytes with the appropriate values and then communicate these as bytes 310. Additionally, the client 100 could increment the value of the number in the bytes 310, or could use some other mathematical or logical operation (e.g., shifting) to prepare the bytes.

Regardless of the values in the bytes 310 that are determined, it is helpful for the value of the byte 310 to be different for each exchange, otherwise the order of reception for the bytes 310 would not be known. In the exemplary embodiment of FIG. 3, each byte 310 has the same value in an exchange, but this could also be modified such that the client 100 and server 200 are able to discern the order of reception for each byte. For example, the client 100 could send a byte 310 having a value of 8 (eight), the server 200 decrements this byte and sends the byte 310 having a value of 7 (seven) back to the client 100. The next exchange would involve values of 6 (six) (from client 100) and 5 (five) (from server 200). The values of the bytes 310 are still different between each exchange. The different byte values serve two purposes: (1) to distinguish remote time out from regular exchange, and (2) to permit a spin loop that detects the change of the byte. The presented protocol assumes in-order delivery, so out-of-order delivery typically is not an issue.

The use of the protocol shown in FIG. 3 includes, but is not limited to, the following benefits in certain exemplary embodiments:

1) Lower latency improves the estimate of clock skew and offset, and leads to increased synchronization accuracy.

2) Network messages are exchanged while execution occurs on both nodes simultaneously.

3) The timing exchange message is simplified by using only a single byte packet payload to eliminate issues associated with network byte order or coherency. For RDMA networks, this also eliminates the need to wait for receive-completion notifications during the time-sensitive message exchange.

4) Timing message exchanges are decoupled from timestamp collection. Each network node records single byte message arrival and departure times and at the completion of the series of single byte message exchanges arrival/departure times are exchanged with the other node.

5) A software implementation of this approach over other hardware time synchronization approaches has further benefits of reduced costs, and ease of installation, upgrading, and maintenance.

In the example of the protocol of FIG. 3, the timing message exchange is therefore decoupled between the client and server node from the timestamp collection. Additionally, the timing message does not contain the arrival timestamp from the other node. In a burst of exchanges, one timestamp can represent arrival of a byte and departure of the reply, because the reply should be immediate. A burst of single byte timing messages is sent between the client and server node, with immediate reply to all but the last byte of an exchange. After a burst of timing message exchanges has completed, the set of arrival times of the timing messages are exchanged.

As stated above, an exemplary communication protocol is built on top of a reliable communication channel. All the messages are delivered in the order they are sent, with a possible delay in the delivery. Because of the possible delay in message delivery, both the client and server programs use the time out mechanism to prevent excessively long ping pong exchanges. Exemplary time out mechanisms are now discussed.

When the client 100 or the server 200 times out waiting for a ping pong reply from the other side (e.g., the waiting node has sent a byte with a value greater than one), the waiting node sends a byte with a predetermined value (in this example, a byte with a value of zero) to indicate a time out and to terminate the current ping pong exchange. A time out is a condition that occurs when a single byte has not arrived at the network node within a predetermined time period.

Figure 4:
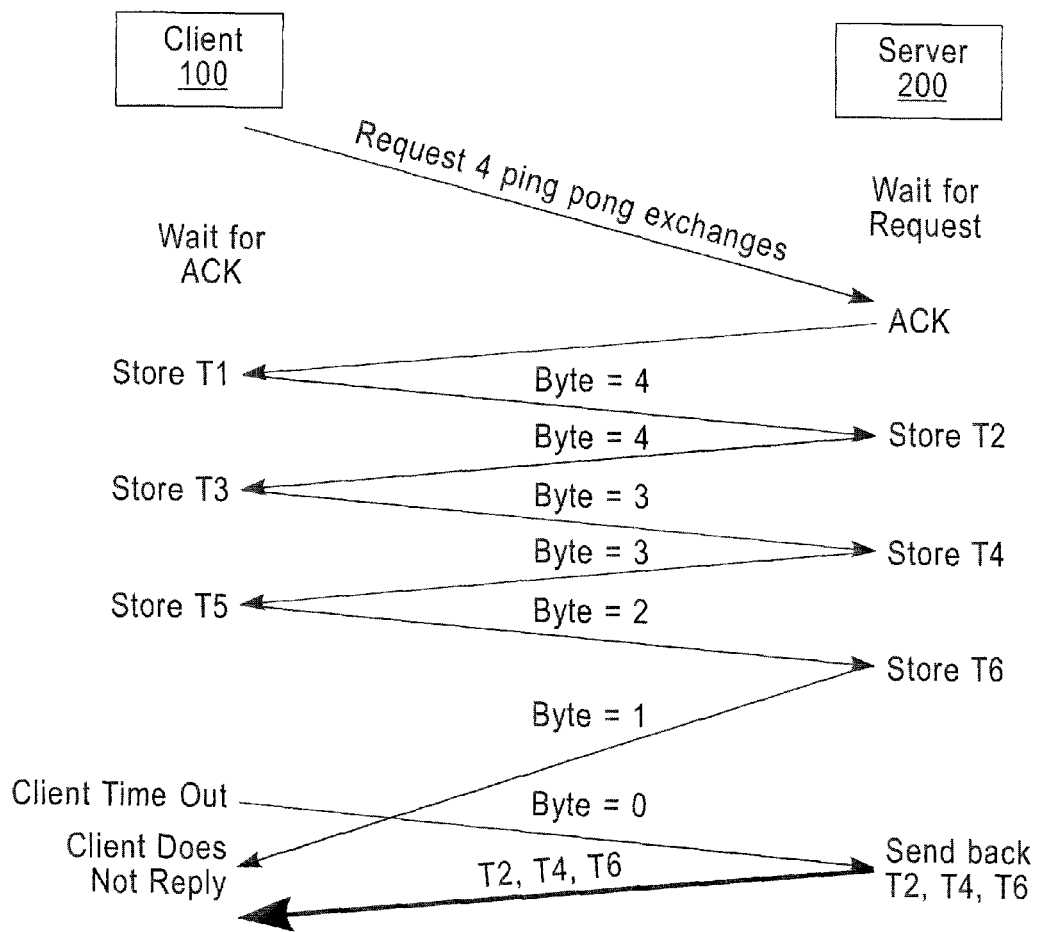
FIG. 4 illustrates an exemplary protocol for performing clock offset measuring, when the client times out.

Referring to FIG. 4, this figure illustrates an exemplary protocol for performing clock offset measuring, when the client times out. The client 100 times out waiting for a return from the server 200 of a byte having the value one. The client 100 responds to the time out by sending a byte having the value 0 (zero) to the server 200. The timed-out client 100 then expects the next message from the server 200 to be the pending single byte followed by a message with the collected timestamps. Notice that if the client 100 sent out byte=1 (one), the client 100 expects the next message from the server 200 to contain the timestamps. The client 100 will keep waiting for the timestamps.

Figure 5:
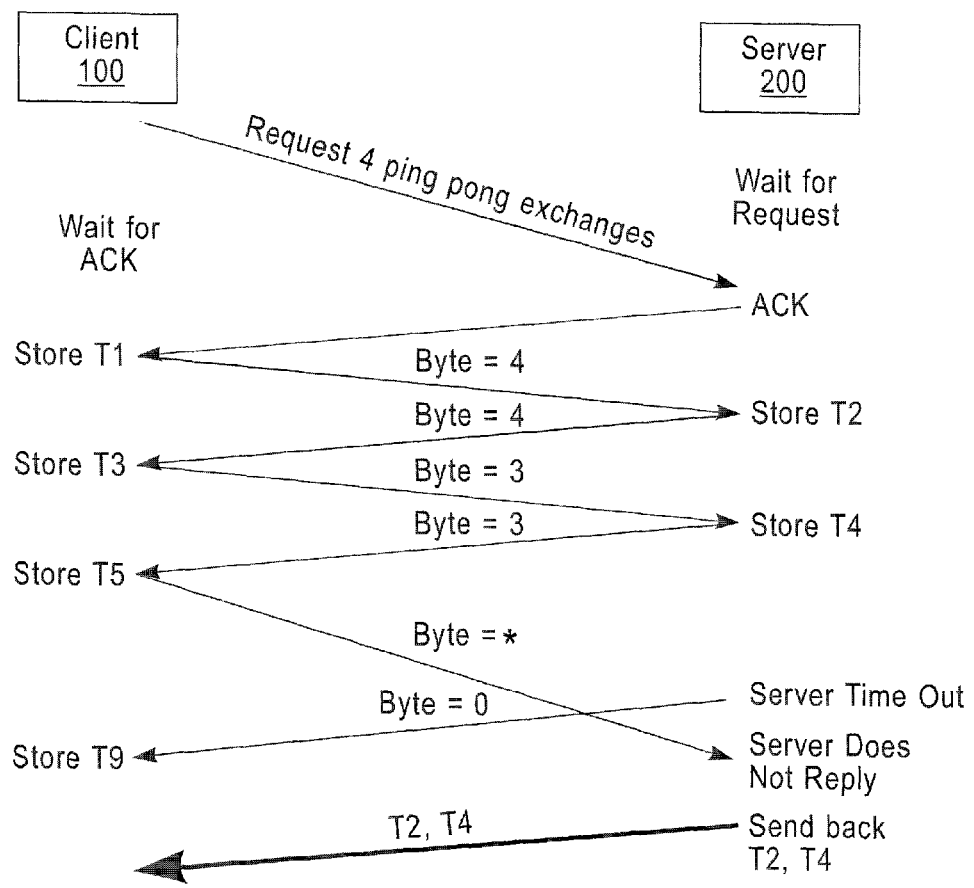
FIGS. 5 and 6 illustrate exemplary protocols for performing clock offset measuring, when the server times out.
Figure 6:
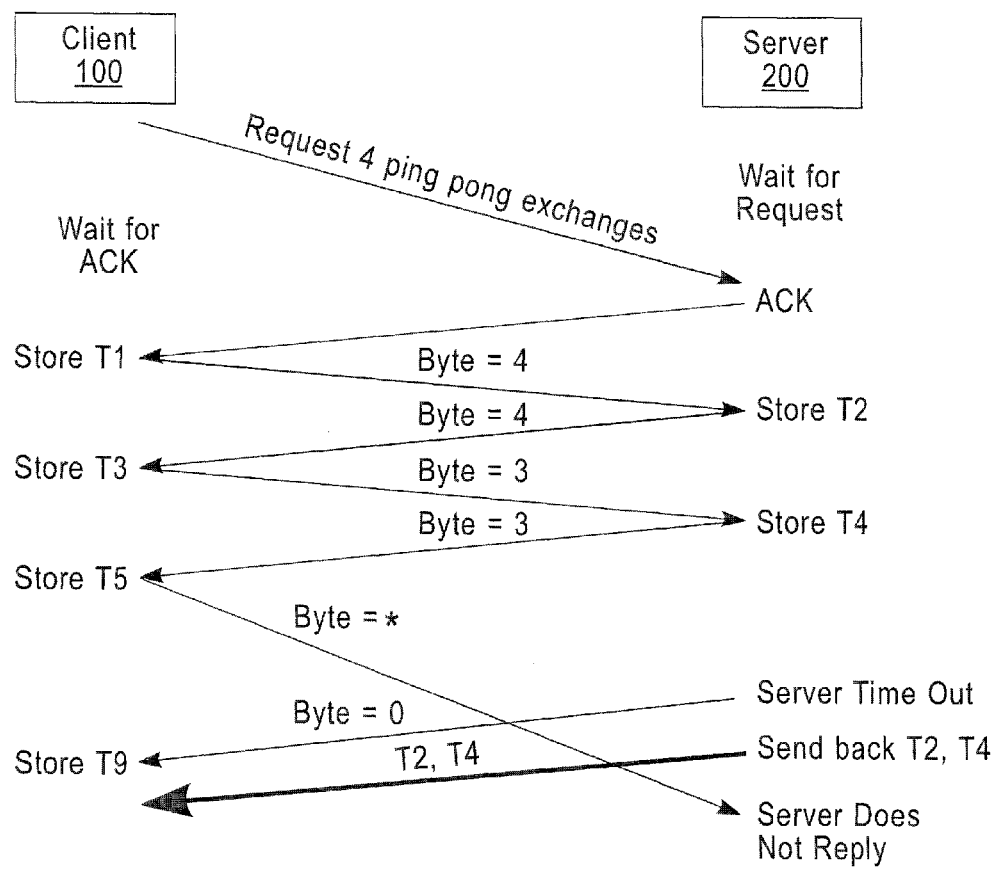

Referring to FIGS. 5 and 6, these figures illustrate exemplary protocols for performing clock offset measuring, when the server 200 times out. The timed out server 200 will send out byte=0 (zero) followed by the timestamps the server 200 has collected so far. In these cases, the server should expect a byte=* (asterisk) message (e.g., a message having a byte with any value) on the way because the client 100 does not know the server 200 has timed out before sending out the byte=* (asterisk) message. In these cases, the server 200 should discard the byte=* (asterisk) message.

FIG. 7 is a diagram of client states and actions, under normal behavior. FIG. 8 is a diagram of client states and actions, under exception behavior. Notice that for a reliable connection, all messages should be delivered, and in the order in which the messages were sent.

FIG. 9 is a diagram of server states and actions, under normal behavior. FIG. 10 is a diagram of server states and actions, under exception behavior. Notice that the server 200 should not receive anything between sending byte=0 (zero) and sending timestamps.

Figure 11:
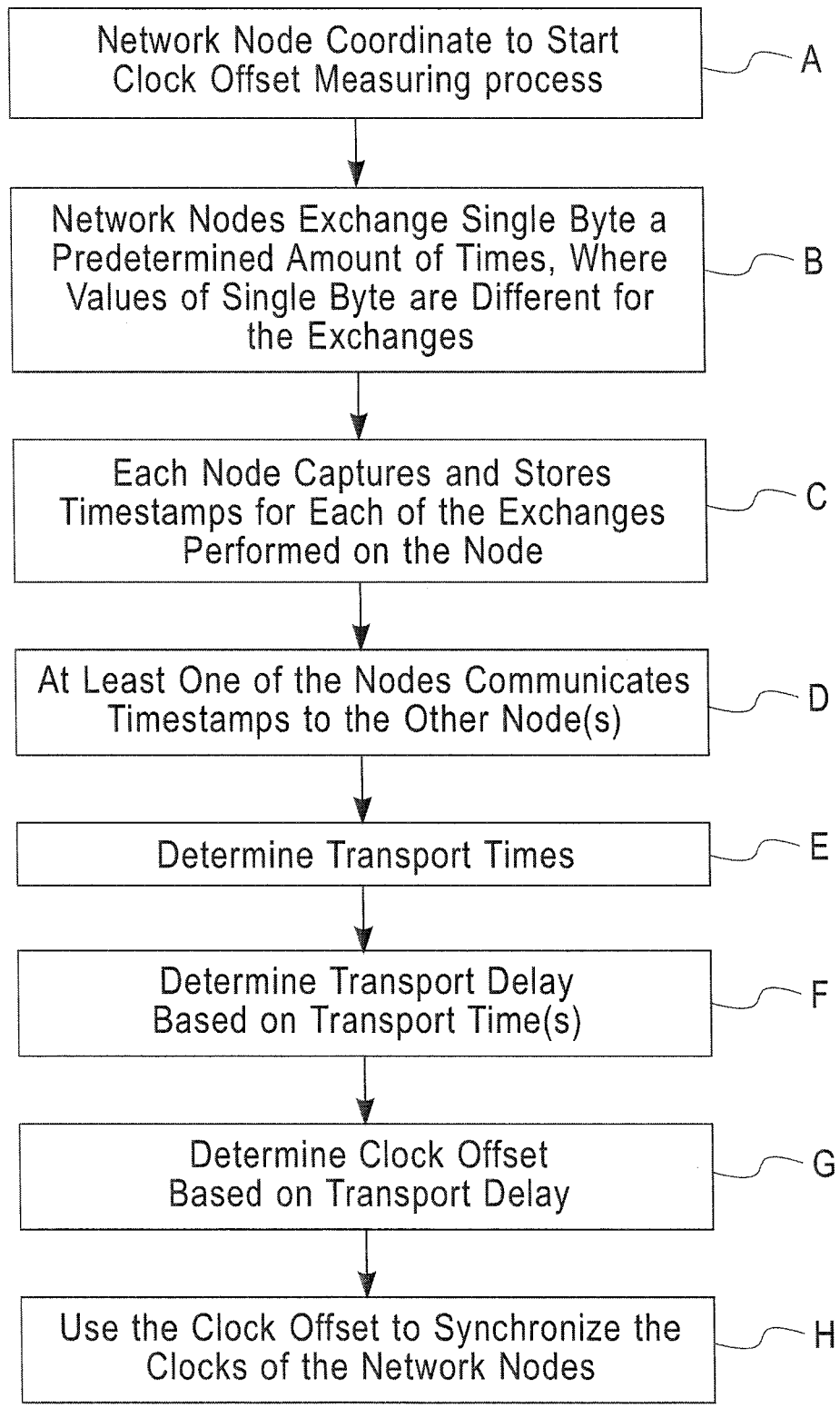
FIG. 11 is an exemplary flow diagram for performing clock offset measuring.

Turning to FIG. 11, this figure illustrates an exemplary flow diagram for performing clock offset measuring. The actions in the flow diagram would be performed by the client 100 and sever 200, each configured, in an exemplary embodiment, by a respective program 102, 202 to perform the actions. Additionally, the actions in the flow diagram of FIG. 11 may be performed by any combination of hardware or software.

In action A, the network nodes coordinate to start a clock offset measuring process. The coordination typically, but is not limited to, having the client 100 request a number of single-byte, ping pong exchanges, and to have the server 200 send an acknowledgement message (as shown, e.g., in FIG. 3). The number of exchanges will generally be between four and ten, although fewer or more may be used.

In action B, the network nodes exchange a single byte for a predetermined amount of times, where the value of the single byte is different for the exchanges (e.g., as shown in and described above in reference to FIG. 3). In an exemplary embodiment, the programs 102/202 implement Remote Direct Memory Access (RDMA) accesses in order to exchange the bytes for action B. These exchanges permit simple data-driven spin-loops to be used in the RDMA case: as soon as the target byte changes, the reply byte can be sent, without having first to poll for a completion status. In the exemplary case of InfiniBand, this can reduce the already low latency by at least a microsecond.

In action C, each node captures and stores timestamps for each part of the exchanges performed on the node. For example (see FIG. 3), the client 100 captures and stores timestamps T1, T3, T5, and T7, and the server 200 captures and stores timestamps T2, T4, T6, and T8. It is noted that FIG. 11 shows a flow diagram for normal processing. Exception processing is shown in FIGS. 4-6, 8, and 20.

In action D, at least one of the nodes communicates stored timestamps to the other node or additional nodes. Typically, server 200 would send its stored timestamps to client 100, which would then perform actions E, F, and G. However, the client 100 could also send its stored timestamps to the server 200, which would then perform the actions E, F, and G. The client 100 and server 200 could also exchange their stored timestamps, and one or both could also send the timestamps to another network node.

In action E, the transport times 105 are determined using the timestamps (such as timestamps T1 through T8 as shown in FIG. 3). The forwards transport times are determined using the difference between adjacent timestamps, Teven–Todd (e.g., T2–T1), and the backwards transport times are determined using the difference between Todd–Teven (e.g., T3–T2). In action F, apparent forwards and backwards transport delays 106 are then selected based at least on the minimum values (for each direction) that were determined in action E. Other techniques may also be used, such as convex hull filtering. With convex hull filtering techniques, the forwards and backwards transport delays 106 can be advantageously collected separately, and any system noise would be filtered out.

In action G, the node (typically, client 100) determines the client or server clock offset 107 based on the apparent forwards and backwards delays determined in action G. In action H, the clock offset 107 is used to synchronize the clocks of the network nodes. Typically, this means that the clock of the client (e.g., clock 109 of client 100 of FIG. 2) would be made to synchronize with the clock of the server (e.g., clock 209 of server 200 of FIG. 2).

For example, if a client 100 wants to track the clock of a server 200, the client 100 repeatedly requests a timestamp exchange in order to measure the current clock offset, and from a history of such measurements and appropriate filtering techniques, the client 100 can then steer its clock 109 to match that of the server 200. This might be done a few times per second, so that if the local oscillator's frequency is stable to for example one or two ppm (parts per million), clock offsets can be controlled at the microsecond level.

One exemplary implementation of the present invention is used to better synchronize the clocks in a cluster of network nodes, and hence allows users to obtain accurate delay measurements for transactions being processed from network node to node. The techniques in embodiments of this invention provide more accurate measurement of the offset and skew between clocks because of the very small packets sent between nodes in a cluster and the tightly coupled ping pong process.

As should be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or assembly language or similar programming languages. Such computer program code may also include code for field-programmable gate arrays, such as VHDL (Very-high-speed integrated circuit Hardware Description Language).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method performed on a network node, comprising:
   performing a plurality of ping pong exchanges of timing messages containing single byte data payloads with another network node, where values of the single bytes are different for the ping pong exchanges, and where there is a predetermined difference between values of the single bytes for each exchange;
   capturing and storing first timestamps for each of the plurality of exchanges performed on the network node;
   receiving, from the another network node and after completion of the performing the plurality of ping pong exchanges, second timestamps corresponding to each one of the plurality of ping pong exchanges; and
   determining clock offset based on the first and second timestamps.

2. The method of claim 1, comprising wherein determining clock offset further comprises measuring a plurality of transport times between the network nodes based at least in part on the first and second timestamps, and determining clock offset for the network node based at least on the transport times.

3. The method of claim 2, wherein the network node comprises a client and the another network node comprises a server.

4. The method of claim 1, further comprising modifying, between each of the ping pong exchanges, the values of the single bytes to create the predetermined difference.

5. The method of claim 1, further comprising, in response to receiving a timing message containing a single byte data payload having a predetermined value in the single byte indicative of completion of a set of the plurality of ping pong exchanges, transmitting all of the stored timestamps to the another network node.

6. The method of claim 1, further comprising determining that a time out has occurred in response to a timing message containing a single byte data payload not being received during a predetermined time period, and transmitting a timing message containing a single byte data payload having a predetermined value in the single byte indicative of the time out to the another network node.

7. The method of claim 6, wherein there is a predetermined number of the plurality of ping pong exchanges, the time out occurs with less than the predetermined number of ping pong exchanges occurring, and the method further comprises one of transmitting the first timestamps to the another network node or waiting for reception from the another network node of the second timestamps for each of the plurality of ping pong exchanges performed on the another network node.

8. The method of claim 1, wherein the values of the single bytes are modified during each ping pong exchange or between each ping pong exchange.

9. A network node comprising:
   a processor configured to cause the network node to perform a plurality of ping pong exchanges of timing messages containing single byte data payloads with another network node, where values of the single bytes are different for the ping pong exchanges, and where there is a predetermined difference between values of the single bytes for each exchange, the processor configured to cause the network node to capture and store first timestamps for each of the plurality of exchanges performed on the network node, to receive, from the another network node and after completion of the performing the plurality of ping pong exchanges, second timestamps corresponding to each one of the plurality of ping pong exchanges, and to determine clock offset based on the first and second timestamps.

10. The network node of claim 9, wherein processor is further configured to cause the network node, when determining clock offset, to measure a plurality of transport times between the network nodes based at least in part on the first and second timestamps, and to determine clock offset for the network node based at least on the transport times.

11. The network node of claim 10, wherein the network node comprises a client and the another network node comprises a server.

12. The network node of claim 9, wherein the processor is further configured to cause the network node to modify, between each of the exchanges, the values of the single bytes to create the predetermined difference.

13. The network node of claim 9, wherein the processor is further configured to cause the network node, in response to receiving a timing message containing a single byte data payload having a predetermined value in the single byte indicative of completion of a set of the plurality of ping pong exchanges, transmit all of the stored timestamps to the another network node.

14. The network node of claim 9, wherein the processor is further configured to cause the network node to determine that a time out has occurred in response to a timing message containing a single byte data payload not being received during a predetermined time period, and to transmit a timing message containing a single byte data payload having a predetermined value in the single byte indicative of the time out to the another network node.

15. The network node of claim 14, wherein there is a predetermined number of the plurality of ping pong exchanges, the time out occurs with less than the predetermined number of ping pong exchanges occurring, and the network node is further configured to perform one of the following: transmit the first timestamps to the another network node; or wait for reception from the another network node of the second timestamps for each of the plurality of ping pong exchanges performed on the another network node.

16. The network node of claim 9, wherein the processor is further configured to cause the network node to modify the values of the single bytes during each ping pong exchange or between each ping pong exchange.

17. A method performed on a network node, comprising:
receiving from another network node a set of timing messages containing single byte data payloads;
capturing and saving arrival timestamps for each of the set of timing messages;
responsive to the receiving, sending to the another network node a corresponding set of timing messages containing a same single byte data payload as contained in the corresponding received timing message, wherein receiving a timing message and sending a timing message forms a ping pong exchange, and where there is a predetermined difference between values of the single bytes for each exchange; and
sending the timestamps to at least the another node in response to completion of receiving the set and sending the corresponding set of timing messages.

18. The method of claim 17, further comprising determining completion of the set of timing messages by determining a timing message comprises a single byte data payload having a predetermined value in the single byte.

19. A non-transitory computer readable medium having instructions for causing a computer to execute the method of claim 17.

20. A network node comprising:
a processor configured to cause the network node to receive from another network node a set of timing messages containing single byte data payloads, to capture and save arrival timestamps for each of the set of timing messages, to send responsive to receiving, to the another network node a corresponding set of timing messages containing a same single byte data payload as contained in the corresponding received timing message, wherein receiving a timing message and sending a timing message forms a ping pong exchange, and where there is a predetermined difference between values of the single bytes for each exchange, and to send the timestamps to at least the another node in response to completion of receiving the set and sending the corresponding set of timing messages.

21. The network node of claim 20, wherein the processor is further configured to cause the network node to determine completion of the set of timing messages by determining a timing message comprises a single byte data payload having a predetermined value in the single byte.

22. A computer program product comprising a non-transitory computer readable storage medium having instructions for causing a network node to perform the following:
performing a plurality of ping pong exchanges of timing messages containing single byte data payload with another network node, where values of the single bytes are different for the ping pong exchanges, and where there is a predetermined difference between values of the single bytes for each exchange;
capturing and storing first timestamps for each of the plurality of exchanges performed on the network node;
receiving, from the another network node and after completion of the performing the plurality of ping pong exchanges, second timestamps corresponding to each one of the plurality of ping pong exchanges; and
determining clock offset based on the first and second timestamps.

23. The computer program product of claim 22, wherein determining clock offset further comprises measuring a plurality of transport times between the network nodes based at least in part on the first and second timestamps, and determining clock offset for the network node based at least on the transport times.

24. The computer program product of claim 23, wherein the network node comprises a client and the another network node comprises a server.

25. The computer program product of claim 22, wherein the instructions further cause a network node to perform the following: modifying, between each of the ping pong exchanges, the values of the single bytes to create the predetermined difference.

26. The computer program product of claim 22, wherein the instructions further cause a network node to perform the following: in response to receiving a timing message containing a single byte data payload having a predetermined value in the single byte indicative of completion of a set of the plurality of ping pong exchanges, transmitting all of the stored timestamps to the another network node.

27. The computer program product of claim 22, wherein the instructions further cause a network node to perform the following: determining that a time out has occurred in response to a timing message containing a single byte data payload not being received during a predetermined time period, and transmitting a timing message containing a single byte data payload having a predetermined value in the single byte indicative of the time out to the another network node.

28. The computer program product of claim 27, wherein there is a predetermined number of the plurality of ping pong exchanges, the time out occurs with less than the predetermined number of ping pong exchanges occurring, and the wherein the instructions further cause a network node to perform the following: one of transmitting the first timestamps to the another network node or waiting for reception from the another network node of the second timestamps for each of the plurality of ping pong exchanges performed on the another network node.

29. The computer program product of claim 22, wherein the values of the single bytes are modified during each ping pong exchange or between each ping pong exchange.

* * * * *